United States Patent
Gaer

(10) Patent No.: US 8,046,289 B2
(45) Date of Patent: Oct. 25, 2011

(54) ELECTRONIC PITCARD FOR WIRELESS FINANCIAL EXCHANGE

(75) Inventor: Samuel Gaer, New York, NY (US)

(73) Assignee: New York Mercantile Exchange, Inc., New York, NY (US)

( * ) Notice: Subject to any disclaimer, the term of this patent is extended or adjusted under 35 U.S.C. 154(b) by 1477 days.

(21) Appl. No.: 10/855,859

(22) Filed: May 26, 2004

(65) Prior Publication Data

US 2005/0171893 A1  Aug. 4, 2005

Related U.S. Application Data

(60) Provisional application No. 60/540,279, filed on Jan. 29, 2004.

(51) Int. Cl.
*G06Q 40/00* (2006.01)
(52) U.S. Cl. .............. 705/37; 705/26.1; 705/36 R
(58) Field of Classification Search ............ 705/35, 705/37, 26, 36 R
See application file for complete search history.

(56) References Cited

U.S. PATENT DOCUMENTS

| | | | | |
|---|---|---|---|---|
| 5,297,031 A * | 3/1994 | Gutterman et al. | .............. | 705/37 |
| 5,497,317 A | 3/1996 | Hawkins et al. | | |
| 5,774,877 A | 6/1998 | Patterson, Jr. et al. | | |
| 5,793,301 A | 8/1998 | Patterson, Jr. et al. | | |
| 5,915,209 A | 6/1999 | Lawrence et al. | | |
| 5,963,923 A * | 10/1999 | Garber | ........................... | 705/37 |
| 6,317,727 B1 * | 11/2001 | May | .............................. | 705/36 R |
| 6,421,653 B1 * | 7/2002 | May | .............................. | 705/36 R |
| 6,505,175 B1 * | 1/2003 | Silverman et al. | ........... | 705/36 R |
| 6,557,029 B2 * | 4/2003 | Szymansky | .................... | 709/206 |
| 6,625,583 B1 * | 9/2003 | Silverman et al. | ........... | 705/36 R |
| 6,766,304 B2 * | 7/2004 | Kemp et al. | ................... | 705/36 R |
| 6,772,132 B1 * | 8/2004 | Kemp et al. | ................... | 705/36 R |
| 6,850,907 B2 * | 2/2005 | Lutnick et al. | .................... | 705/37 |
| 6,876,309 B1 * | 4/2005 | Lawrence | ................ | 340/825.26 |
| 6,938,011 B1 * | 8/2005 | Kemp et al. | ...................... | 705/37 |
| 6,963,856 B2 * | 11/2005 | Lutnick et al. | .................... | 705/37 |
| 6,993,504 B1 * | 1/2006 | Friesen et al. | .................... | 705/37 |
| 6,996,540 B1 * | 2/2006 | May | ................................ | 705/37 |
| 7,080,034 B1 * | 7/2006 | Reams | ............................ | 705/37 |
| 7,107,240 B1 * | 9/2006 | Silverman et al. | .............. | 705/37 |
| 7,127,424 B2 * | 10/2006 | Kemp et al. | ...................... | 705/37 |
| 7,130,789 B2 * | 10/2006 | Glodjo et al. | .................... | 705/37 |
| 7,184,984 B2 * | 2/2007 | Glodjo et al. | .................... | 705/37 |

(Continued)

OTHER PUBLICATIONS

P. Albinus, *New Floor, New Gear*, Sep. 2003, Risk Waters Group.

(Continued)

*Primary Examiner* — Jagdish Patel
*Assistant Examiner* — Sara Chandler
(74) *Attorney, Agent, or Firm* — Banner & Witcoff Ltd.

(57) ABSTRACT

Systems and method for facilitating trading in a financial exchange including generating a pitcard interface on a wireless handheld computer. The pitcard interface includes a plurality of information display windows; a plurality of user input controls; and a view-specific data window, wherein the selection, order and arrangement of data in the view-specific data window is dependent upon the view currently selected by the user. In particular examples the wireless handheld computer allows a user to customize the particular interface components with shortcuts, hints, and/or auto-fill capabilities that enable the user to enter transaction information quickly and efficiently. Because these customizations are selected for a specific user, they support the needs of the specific user and are more efficient than direct entry of all transaction information using keyboard/keypad entry devices.

20 Claims, 10 Drawing Sheets

U.S. PATENT DOCUMENTS

| | | | |
|---|---|---|---|
| 7,228,289 B2 * | 6/2007 | Brumfield et al. | 705/35 |
| 7,246,093 B1 * | 7/2007 | Katz | 705/37 |
| 2002/0069156 A1 * | 6/2002 | Adam et al. | 705/37 |
| 2002/0091624 A1 * | 7/2002 | Glodjo et al. | 705/37 |
| 2002/0120555 A1 * | 8/2002 | Lerner | 705/37 |
| 2003/0009411 A1 * | 1/2003 | Ram et al. | 705/37 |
| 2003/0018569 A1 * | 1/2003 | Eisenthal et al. | 705/37 |
| 2003/0097325 A1 * | 5/2003 | Friesen et al. | 705/37 |
| 2003/0149652 A1 * | 8/2003 | Pham | 705/37 |
| 2003/0171965 A1 * | 9/2003 | Ratzlaff et al. | 705/8 |
| 2003/0236737 A1 * | 12/2003 | Kemp et al. | 705/37 |
| 2004/0093300 A1 * | 5/2004 | Burns | 705/37 |
| 2004/0133506 A1 * | 7/2004 | Glodjo et al. | 705/37 |
| 2005/0149362 A1 * | 7/2005 | Peterson et al. | 705/3 |

OTHER PUBLICATIONS

International Search Report—PCT/US05/02315 (Nov. 8, 2006).

* cited by examiner

ELECTRONIC PITCARD FOR WIRELESS FINANCIAL EXCHANGE

RELATED APPLICATIONS

The present invention claims the benefit of U.S. Provisional Patent Application Ser. No. 60/540,279 filed on Jan. 29, 2004.

BACKGROUND OF THE INVENTION

1. Field of the Invention

The present invention relates, in general, to electronic data entry systems, and, more particularly, to a user interface, systems and methods for recording and entering data related to transactions on an trading floor.

2. Relevant Background

Securities, commodities and negotiable instruments are traded on various exchanges that strive to provide an efficient marketplace for the trading of products listed on the exchange. An "open outcry" auction market, such as a commodities exchange, provides floor trading facilities for the buying and selling of listed commodities.

Floor trading is generally confined to specified trading areas that are typically referred to as trading "pits" or "rings". Within a trading ring, floor traders vary in the scope of their trading activities. Some floor traders trade only for their own proprietary accounts or for the proprietary accounts of their employer; other floor traders only execute orders on behalf of others; and some floor traders trade for proprietary accounts and also execute orders for others. For convenience, this document shall use the term "broker" to refer to floor traders engaging in any or all of the trading activities noted above.

Floor brokers congregate in the trading rings or pits on the exchange floor where they announce a "bid" price for an offer to buy and an "ask" price for an offer to sell. A trade in any particular commodity generally will occur at or within the spread for best bid and best ask prevailing in the trading ring at that time. The best ask price is the lowest price that a seller is willing to accept and a best bid price is the highest price that a buyer is willing to pay. Exchange employees confirm transaction prices for executed transactions and also confirm on an ongoing basis throughout the trading session the prevailing best bid and ask prices that are provided by the various brokers. Exchange employees strive to ensure that executed trades are posted with the Exchange and also undertake other activities that facilitate trades and that maintain a fair and orderly market.

In a commodity exchange, using the example of the execution of an order for an off-floor customer, such a transaction is initiated by a customer who places or has previously placed an order to buy or sell a particular commodity. The order is then conveyed to the customer's broker or another trader representing the customer's broker on the trading floor. In the case of a broker trading on the broker's own account, the transaction is initiated by the broker directly. Typically, brokers tend to trade and to specialize in the commodity or commodities that are traded within the same trading ring. Brokers are known to other brokers on the trading floor by an identifying number or short name. The brokers announce offers on the trading floor to implement their customer's orders. For each commodity that is listed for trading at a commodity exchange, the exchange will indicate the number of contract months, which are sometimes referred to as delivery months that are listed for that commodity, and different delivery months may trade separately at separate prices.

At an exchange using a "pitcard" system for entry of executed trades to the exchange, once a buying broker and selling broker agree on a price, the selling broker and/or buying broker record the transaction on a pad of paper or a multipart form that includes forms that are called "pitcard" and that may include other forms that are sometimes referred to as "trading cards". The information that is recorded includes the commodity code, quantity, delivery month, price, as well as the ID number or name for the buyer's broker and seller's broker. At commodity exchanges using the pitcard system, the pitcard is physically thrown into the center of the trading ring by the buyer and/or seller, where it is collected by an exchange employee, clocked, and delivered to data entry personnel.

The extensive manual operations involved in the conventional trade recording system can lead to trade execution delays, illegibly transcribed orders, dropped slips, delayed delivery, and mismatches between buy-orders and sell orders that are not detected for some time. Although some exchange functions have been computerized, the basic activities of trade entry by brokers have posed problems for computerization. A root problem is that any transaction recordation system must support a peak level of trading volume of the exchange. In a stock exchange there is typically a specialist system in which each trader/broker handles a stock for a single company. Transactions are conducted between a relatively small number of individuals and so identifying and recording broker names/identifications is relatively easy. Moreover, in a stock exchange there is little variation in the type of information that must be captured for each transaction. Hence, even at very large transaction volumes the pace at which information is recorded and entered into the trading system is manageable.

In contrast, a commodity exchange such as the New York Mercantile Exchange ("NYMEX") may be organized as an open system in which many traders (e.g., 100-200 individuals) are gathered at the trading pit for a given commodity. A particular broker may only be actively trading with a subset of 10-20 individuals. Because of the large number of traders, just entering and recording the broker identification for a particular transaction is difficult as compared to many trading floor environments. Further, each given commodity involves contracts in a variety of delivery months, and may involve derivative products such as options. As a result of these factors, the amount of information and pace at which that information must be recorded and entered by brokers/traders is significantly greater than in trading floor environments such as a stock exchange.

To date, the paper-based workflow described above remains the only effective way to record and enter transaction information in many commodity exchanges. The paper-based workflow relies on transaction information written quickly by traders using various shorthand techniques with symbols and markings that may be intelligible only to particular brokers or exchange employees familiar with the brokers involved in a transaction. In this environment, trying to capture pen strokes in an electronic device is problematic as accurately translating the hurriedly written pen strokes is so complex that only humans have been able to perform the task. On the other hand, having brokers type in information using keyboard/keypad interfaces is time consuming and does not support the rate at which information needs to be captured.

U.S. Pat. No. 6,625,583 issued to Silverman et al. describes a handheld trading system interface that enables entry of trade information on a trading floor of a financial exchange. The system described by Silverman presents a complex, multi-function interface that is specifically adapted for a stock exchange. Many features of the Silverman order entry interface are intended to emulate or simulate a paper trade recordation system. As a result, the Silverman system is not able to handle order entry at a pace necessary for high transaction volume environments such as a commodity exchange.

Accordingly, a need exists for wireless hand-held computers that can be used to exchange information with floor brokers. Further, there is a need for a trade entry interface that exhibits ease of use and allows brokers to enter trade information at least as fast if not faster than paper-based systems. Consequently, improved hand-held computer systems for trade entry are desired.

SUMMARY OF THE INVENTION

Briefly stated, the present invention involves systems and method for facilitating trading on a trading floor by generating a pitcard interface on a wireless handheld computer. The pitcard interface includes a plurality of information display windows; a plurality of user input controls; and a view-specific data window, wherein the selection, order and arrangement of data in the view-specific data window is dependent upon the view currently selected by the user. In particular examples the wireless handheld computer allows a user to customize the particular interface components with shortcuts, hints, and/or auto-fill capabilities that enable the user to enter transaction information quickly and efficiently. Because these customizations are selected for a specific user, they support the needs of the specific user and are more efficient than direct entry of all transaction information using keyboard/keypad entry devices.

DETAILED DESCRIPTION OF THE PREFERRED EMBODIMENTS

The present invention is illustrated and described in terms of a wireless trade entry device that is particularly useful for high volume financial trading markets such as commodities exchanges. In these environments users must be able to enter trade information as quickly as possible. At the same time, this trade information must be entered accurately and transmitted reliably to a trade management system. These ends are served by a particularly efficient data entry interface of the present invention. Although the invention is described in terms of commodity trading, the transaction interface of the present invention is readily adapted to support a wide variety of trading activities including a variety of options contracts, futures contracts and the like. Further, the particular examples given herein relate to a physical trading arena, however, the electronic data recording/entry device in accordance with the present invention is readily implemented by brokers/traders that are in different physical locations.

The present invention combines a variety of features that allow a user to customize a particular interface device with shortcuts and auto-fill capabilities that enable the user to enter transaction information quickly and efficiently. Because these customizations are selected for a specific user, they support the needs of the specific user and are more efficient than direct entry of all transaction information using keyboard/keypad entry devices.

Figure 1:
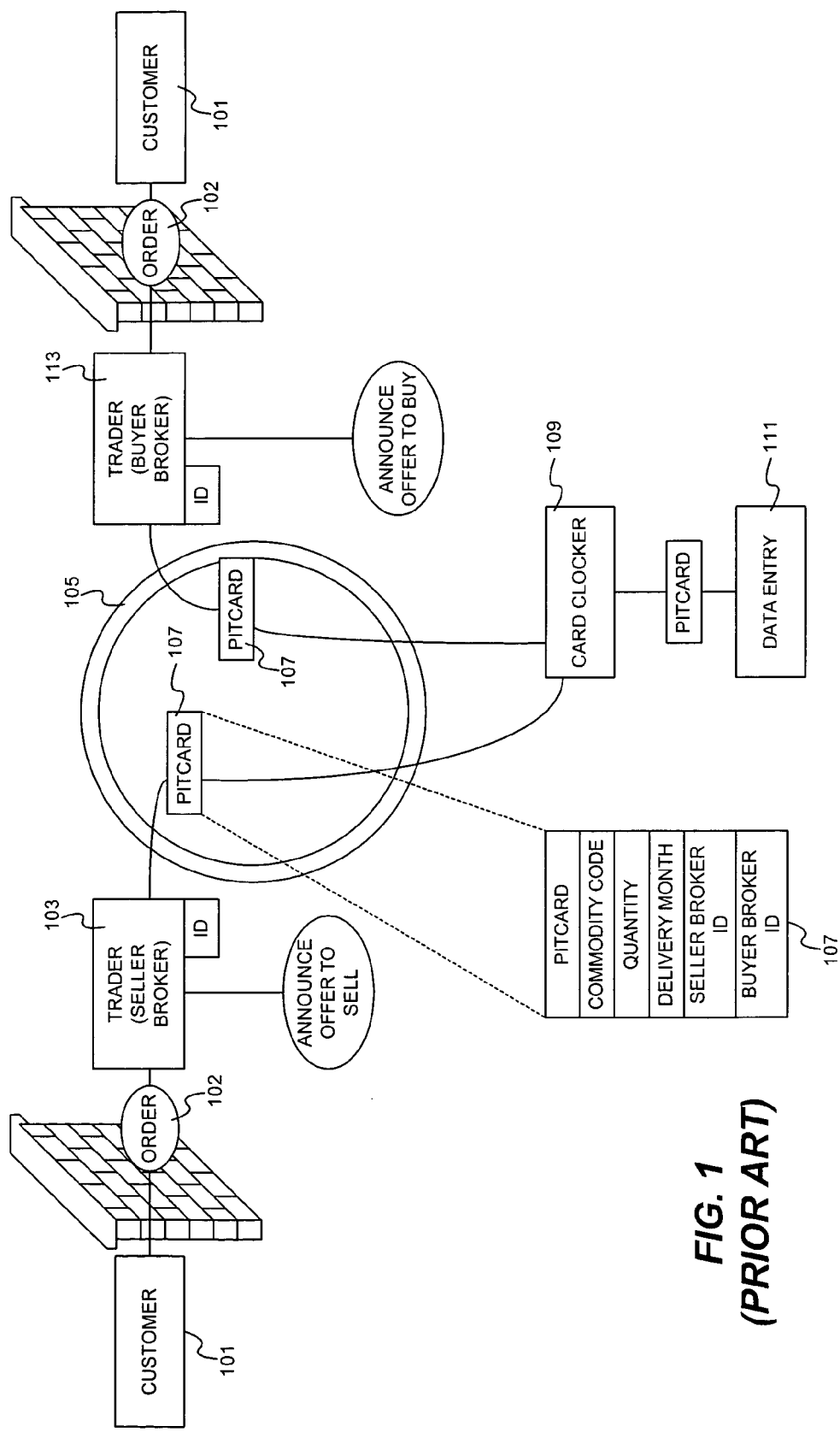
FIG. 1 shows a prior art paper-based trade entry system.

FIG. 1 shows a prior art paper-based trade entry system as might be used on the trading floor of a commodities exchange. Customers 101 wish to buy or sell positions in a particular commodity. Customers 101 are not identified to each other and place orders 102 through brokers 103/113. A seller broker 103 receives a sell order from customer 102 whereas a buyer broker 113 receives a buy order from a customer 102. In practice, brokers act as both buyers and sellers depending on the needs of their customers. Brokers 103 and 113 are identified by an ID such as a badge with an alphanumeric code.

In the example of a commodities exchange, a trading arena called a "pit" 105 provides a meeting ground for brokers 103/113 in a particular commodity. Broker 103 announces an offer to sell a quantity of the particular commodity at a particular price. Conversely, the buyer broker 113 announces offers to buy with similar particulars. When the brokers 103/113 agree on terms, they each "card" the trade by recording the trade particulars (e.g., price, quantity, delivery month, buyer seller broker IDs, and the like) on a piece of paper called a "pit card" 107. A pit card may be used to record multiple trades.

Depending on the exchange rules, one or both brokers 103/113 must submit the carded trade(s) within a specified period of time (e.g., one minute). This is accomplished by literally throwing the completed pit card 107 into the pit 105 where an exchange employee gathers the cards and submits them to a card clocker 109. The paper pit card is then given to a data entry clerk 111 who reads the handwritten trade parameters from the pit card and enters the data into an electronic trade management system.

In the paper-based system of FIG. 1, the rate at which the brokers 103/113 can enter information onto the pit card has been a limiting factor in periods of high volume trading. While the paper-handling procedures that occur after the pit card is thrown into pit 105 seem inefficient, with enough manpower exchanges have been able to handle large transaction volumes. The information entry tasks performed by the brokers 103/113, however, cannot be performed by anyone else, and so remain a limiting factor in how fast an exchange can operate. Because of this factor, it has been very difficult to develop effective electronic trade entry devices, as either the devices themselves or the user interfaces have been more cumbersome than paper-based trade entry systems.

Figure 2:
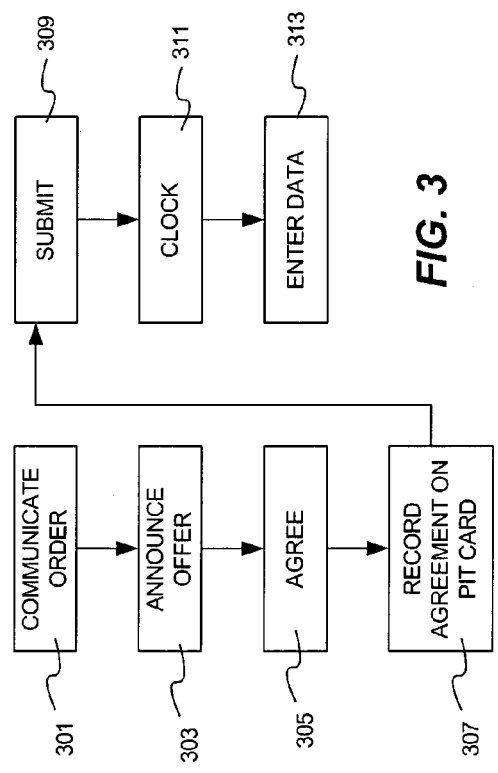
FIG. 2 illustrates an electronic trade entry system in accordance with the present invention.

FIG. 2 illustrates an electronic trade entry system in accordance with the present invention. Handheld trade entry device 201 executes software to implement a user interface in accordance with the present invention, and to submit commodities transaction data to upstream trade processing systems such as server 203 and trade management system 205. In a particular embodiment trade entry device 201 is implemented using a handheld computer such various models sold by Hewlett Packard Corporation, PalmOne, Inc., Handspring, Dell, and other manufacturers. In particular embodiments trade entry device 201 executes a Windows Mobile™ operating system, although the system in accordance with the present invention is readily adapted to other operating systems. Electronic trade entry device 201 may include physical buttons for entering information or signaling actions, but preferably uses a touch screen to capture trade information from brokers 103/113.

Trade entry device 201 captures data that represents one or more commodities transactions in which a broker 103/113 has participated. When the broker 103/113 using the trade entry device 201 activates a "submit" control, the trade data is sent to a server 203 which collects trade data from a number of brokers. In a particular implementation device 201 sends a hypertext transfer protocol (HTTP) or secure HTTP request that is addressed to server 203, which is implemented as a web server in the particular example. The use of HTTP/web protocols makes available a wide variety of off-the-shelf software and hardware that can be readily adapted for use in the present invention. Proprietary protocols may be substituted in particular applications.

The HTTP request includes parameters having values that represent the transaction data. In addition, the HTTP requests include identification and authentication information such as a user name and password. In this manner, the communication between the entry device 201 and server 203 is sessionless which allows each request to be independently authenticated and authorized. Moreover, each request can be definitely associated with a particular broker and entry device 201 which improves auditability.

Web server 203 parses the request and uses an XML generator to generate an XML document containing the transaction data. The XML document is represents the transaction data in a format that is both readily extensible and very portable. The form and content of the XML document can be validated against a data type definition (DTD) or XML Schema to ensure correctness.

Web server 203 may implement a wide variety of auxiliary trade services as well. One advantage of using a web server to implement server 203 is that the web server APIs are well suited for adding additional services. Examples of such services include services that validate the incoming HTTP request, match requests from buyers 103 and sellers 113 to ensure that similar data was recorded by each broker, notify brokers 103/113 of events and/or errors, and other trade services that can be accomplished on the trade floor before the trade data is entered into trade management system 205.

Web server 203 responds to the HTTP request with an HTTP response indicating the action taken. For example, web server 203 may send an HTTP response confirming that the trade information was successfully transferred to trade management system 205. Alternatively, web server 203 may indicate an error occurred, or notify the broker of other information relevant to the submitted trade information.

Figure 3:
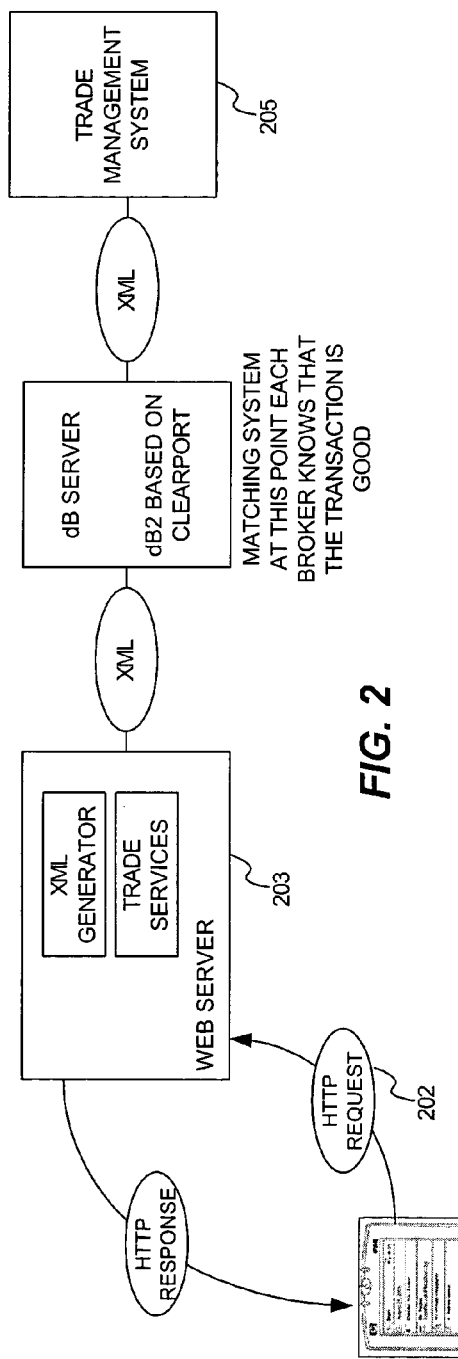
FIG. 3 shows activities involved in an exemplary implementation of the present invention.

Using the wireless trade entry device 201, the information flow provided by the traditional paper process shown in FIG. 1 can be largely replicated as shown in the flow diagram of FIG. 3. For example, the activities involved in communicating order information in 301, announcing offers in 303, and reaching agreement as to transaction terms in 305 are largely similar to conventional paper processes. In 307 the brokers enter transaction information into the electronic pit card rather than a paper pit card. As will be seen, the user interface of the present invention implements trading-floor specific features so that the broker is able to enter information is at least as fast as on paper systems. Rather than throwing a paper card into a pit, the broker activates a submit control in 309 and the carded transaction information is submitted to server 203 (shown in FIG. 2) and immediately "clocked" in activity 311. Data entry 313 can be implemented automatically as an XML record is generated holding the transaction data.

Figure 4:
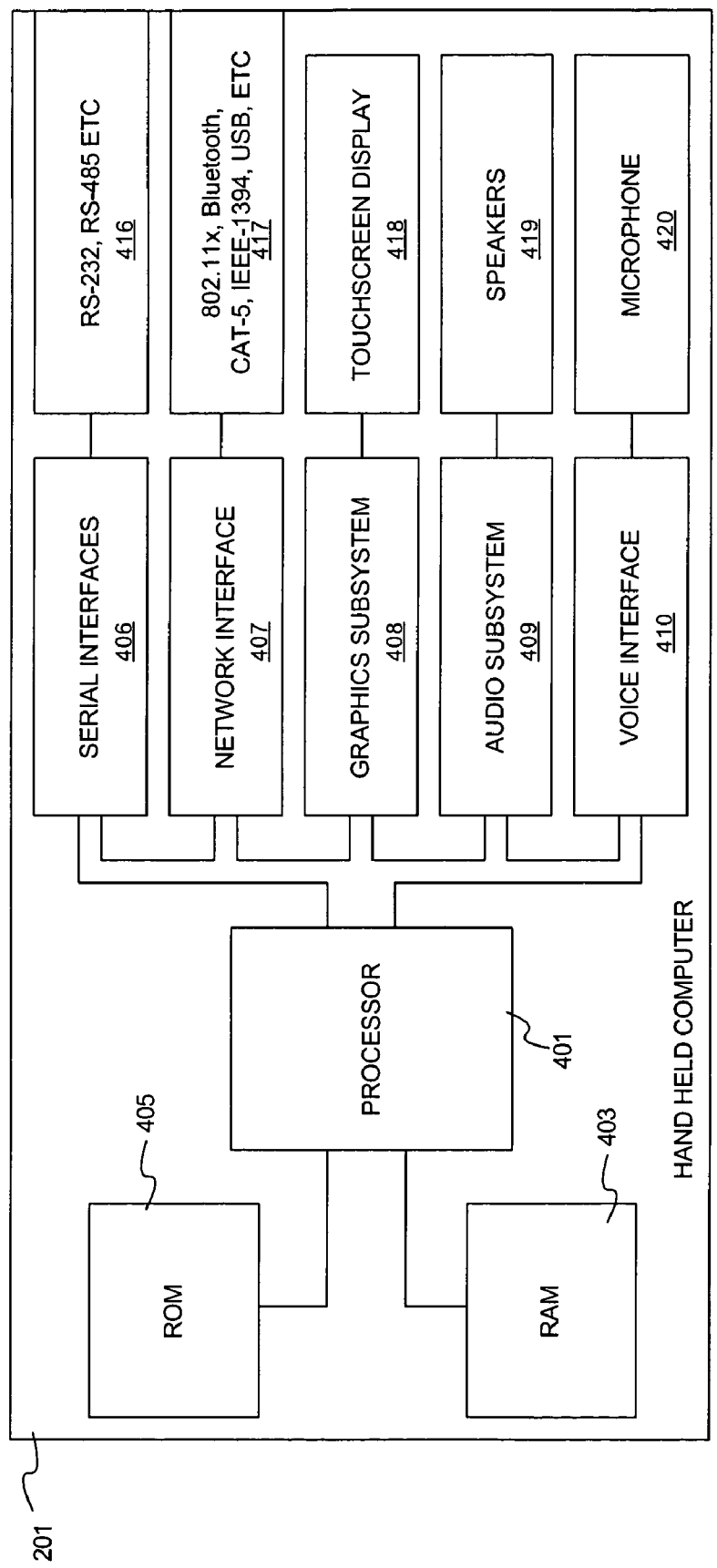
FIG. 4 shows a block diagram of an exemplary wireless computing device in which the present invention may be implemented.

FIG. 4 shows a hardware view of an embodiment of a wireless trade entry device 201 in which the present invention can be implemented. Various features of the present invention can be implemented as software code that is executed on processor 401 and stored in RAM 403 and/or ROM 405. Processor 401 is coupled to a variety of sub-system modules such as serial interfaces 406, network interfaces 407, graphics subsystem 408, audio subsystem 409, and/or voice interface 410. The subsystems 406-410 may be implemented as separate hardware components or integrated within processor 401 depending on the particular implementation. Operating system and/or application code executed by processor 401 includes drivers for communicating with the subsystem components 406-410.

Serial interfaces 406 communicate with various hardware interfaces 416 such as RS-232 and RS-485 serial ports. Serial ports 416 may include proprietary ports as well in combination with any desired serial port interface such as universal serial bus, EEE-1394, and the like. Serial interfaces 106 in combination with serial ports 417 enable the trade entry device 201 to communicate with a variety of auxiliary components such as printers, keyboards, memory and the like.

Network interfaces 407 communicate with hardware network ports such as category-5 cable, 802.11x wireless ports, Bluetooth ports and the like. Wireless network ports are preferable in the trading floor environment to ease use and installation. Network interface 407 implements the resources such as buffers and signaling necessary to communicate with the hardware ports.

Graphics subsystem 408 includes the hardware and software resources to draw images onto touch screen display 418, and receive input from touch screen display 418. For example, processor 401 will execute instructions that manipulate pixels values in touch screen display 418 and write the results to buffer memory in graphics subsystem 408. Graphics subsystem 408 handles the actual pixel manipulation as well as interpreting the position of user interactions with the touch screen display 418. Optional audio subsystem 409 and voice interface 410 may be provided to enable the user to interface using voice commands through microphone 420 and/or receive information through speakers 419 or the like.

Figure 5A:
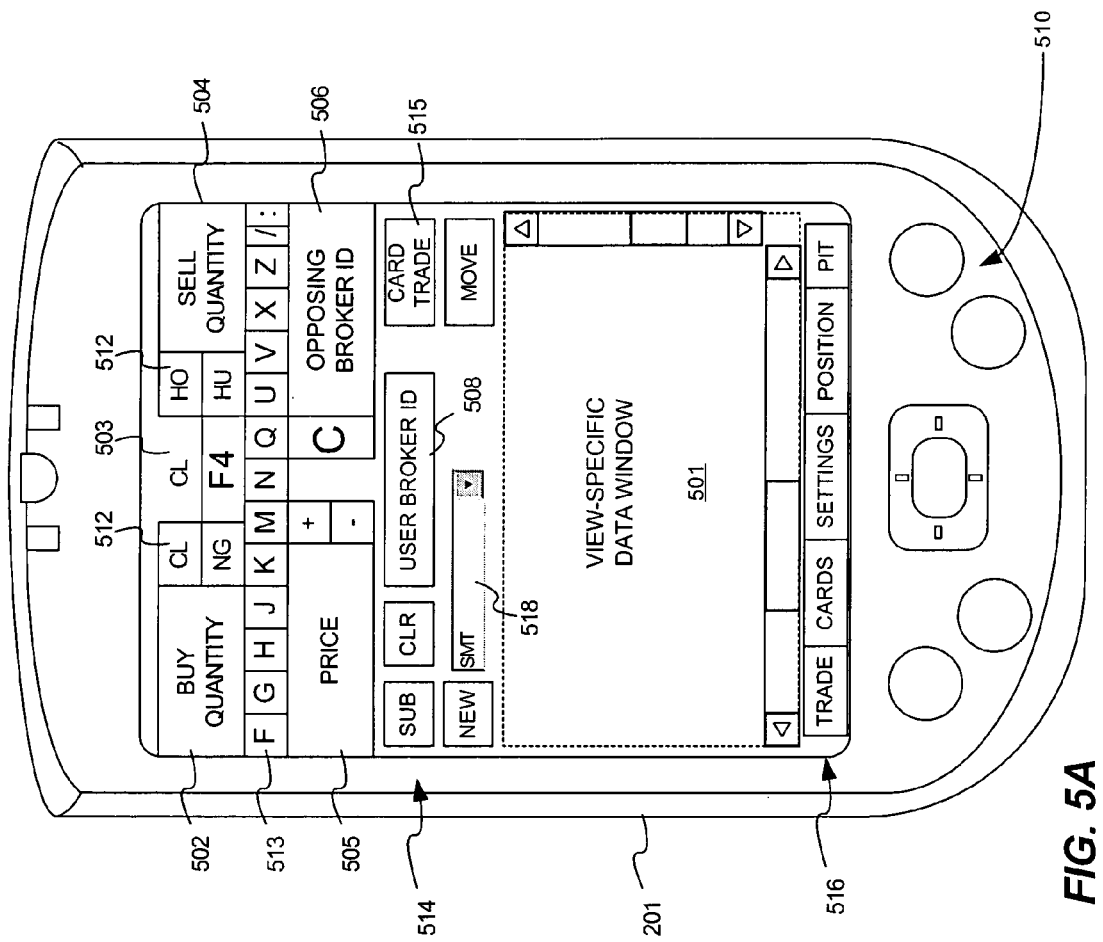
FIG. 5A through FIG. 5C show selected views of a graphical user interface in accordance with a particular embodiment of the present invention.
Figure 5B:
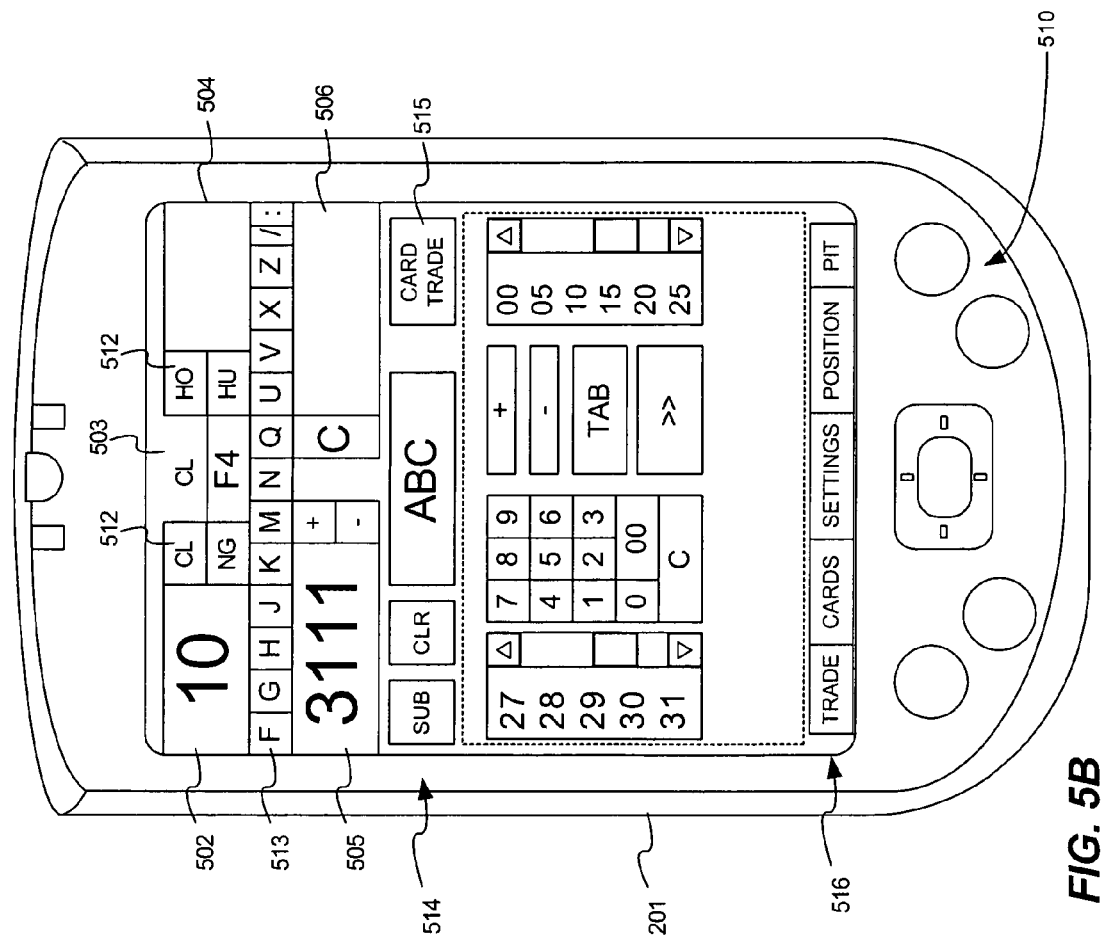
Figure 5C:
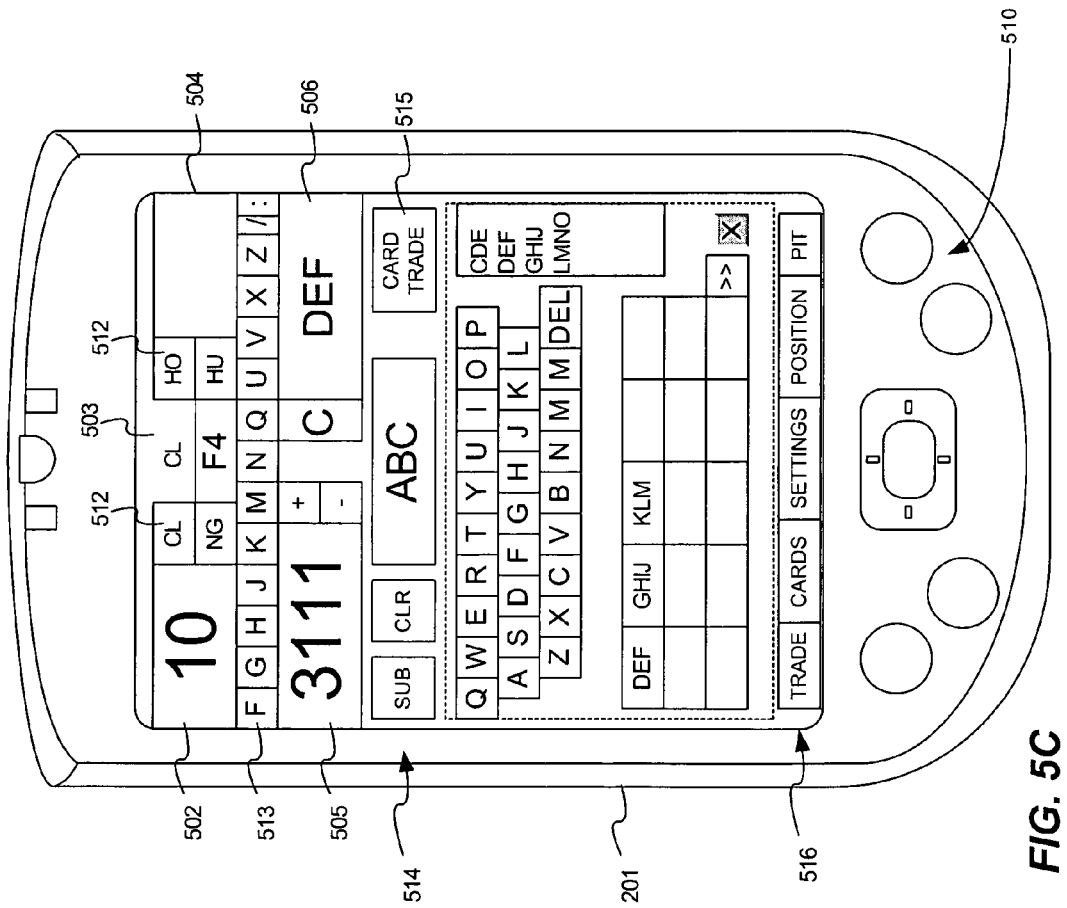

As shown in FIG. 5, a graphical user interface in accordance with an implementation of the present invention includes a view-specific display window 501, a plurality of data display windows 502, 503, 504, 505, 506 and 508, as well as a plurality of user-selectable graphical controls such as 512, 513, 514, 515, 516 and 518. Additionally, the trade information entry device 201 may provide hardware controls 510 that can be used for navigation and activating particular functions. Although it is contemplated that hardware controls 510 may be used in conjunction with the order entry features of the present invention, the graphical controls and display windows are principle features of the present invention.

Data display windows 502, 503, 504, 505, and 506 are examples of window that display specific items of data as that data is entered by a broker. Window 502 displays a buy quantity and may include a color coded background (e.g., blue) to make it readily identifiable. Similarly, window 504 displays a sell quantity and may include a color coded background (e.g., red). A consistent color scheme makes identification of a particular data item faster and more reliable for many users. In a particular embodiment display windows 502 and 504 can be activated by a user tapping on the touch screen within the boundaries of the windows 502/504. Once activated, a numeric entry device such as a virtual keypad, selection list, or dropdown list is drawn into the view-specific data window 501. Particularly in the case of commodities trading, due to individuals trading patterns, the contract transaction sizes (i.e., trade size or lot size) may become standardized by trade ring practices, and the quick key allows the data to be entered with fewer taps. Presenting a constrained list of options in the form of a selection box is an efficient manner of entering buy/sell quantities in windows 502/504, and enabling the user to program the quick key enables sufficient customization to support the variations in individual preferences and/or trade ring practices.

Commodity code window 503 displays a commodity code for the current trade. In many cases a broker will be working with a single commodity. In other cases a broker may work at multiple pits switch between commodities frequently. Display window 503 displays the standard commodity code for the financial exchange, which can be selected by activating one of graphic controls 512.

Price display window 505 displays the agreed upon price for the current transaction. In a particular embodiment display window 505 is activated by a user tapping on the touch screen within the boundaries of the window 505. Once activated, a numeric entry device such as a virtual keypad is drawn into the view-specific data window 501. Efficient entry of price data is an important performance feature as it must be entered in each of a large number of transactions. The virtual keypad approach of the present invention enables efficient entry of numeric information without requiring the user to refer to a keypad or keyboard that is outside the field of view, such as is the case with hardware buttons. Further, even though some operating systems may provide keyboard/calculator applications as built-in features, these applications take over the entire display which interferes with the user's ability to enter data while still viewing the context of the particular transaction. To resolve these issues, the present invention uses a software-implemented graphical keypad that consumes only a portion of the screen area so that the view-independent portions of the screen remain visible.

User broker ID field 508 displays an identifier or mnemonic for the broker using the trade entry device 201. Opposing broker ID field 506 displays an identifier for a broker on the opposite side of the current transaction. Each broker is identified with a code or mnemonic. In a particular embodiment display window 506 is activated by a user tapping on the touch screen within the boundaries of the window 506. Once activated, an alphanumeric entry device such as a virtual keyboard (shown in FIG. 5C) may be drawn into the view-specific data window 501. Like the virtual keypad discussed above, the virtual keyboard of the present invention enables efficient entry of alpha information without requiring the user to refer to a hardware keyboard. Further, even though some operating systems may provide virtual keyboard applications as built-in features, these applications take over the entire display which interferes with the user's ability to enter data while still viewing the context of the particular transaction. To resolve these issues, the present invention uses a software-implemented graphical keypad (shown in FIG. 5B) that consumes only a portion of the screen area so that the view-independent portions of the screen remain visible.

To improve efficiency of entering broker identifications, the present invention enables the user to create a shortlist of frequently encountered broker IDs. The user can select one of these previously entered IDs directly by tapping the appropriate graphical control and avoid typing. In one embodiment the shortlist of frequently encountered IDs is presented as a table in the view-specific data window 501. In another embodiment the shortlist of IDs is implemented as a most recently used table such that the table is ordered according to how recently the ID was used in a transaction, and as the table fills the least recently used ID will be dropped off the table. Alternatively, the table can be maintained as a most frequently used list.

In addition to the display windows, the present invention contemplates a display with a number of user-selectable graphical controls such as 512, 513, 514, 515 and 516 that support efficient entry of commodity trading information. For example, controls 512 present commodity codes that can be quickly selected to enable a broker to move from pit-to-pit trading multiple commodities. The order of the commodity code controls 512 may be static or may change depending on frequency of use or other criteria.

A delivery month keyboard 513 is implemented as a graphical control that includes a plurality of month codes that are used by the commodities exchange. For example, "F" represents January, "G" represents February and the like. This specialized keyboard is adapted to the commodities trading environment where each transaction requires entry of not only the commodity code, but also the delivery month and year. In particular embodiments the delivery month keyboard 513 is dynamically displayed so that the current delivery month appears at the left-most portion of the screen. This is advantageous in cases where the majority of transactions involve the current delivery month, or where current delivery month transactions require faster input. Moreover, brokers 103/113 may perceive the calendar relative to the current month, and the rolling display makes it easier to locate any deliver month. In operation, as the trading month changes from, for example, January to February, the delivery month keyboard 513 changes from "F" being at the left-most location to "G" appearing the left most position and "F" rolling over to the right-most position and each other month code indexing left one position.

Each trade is performed on behalf of a particular customer account or on behalf of the broker's own account. When working for customer account, brokers may receive new order information from off-floor customers while on the trading floor. List box control 518 provides a quick tool for selecting a customer identifier when entering order information and for identifying when the broker is trading on their own account. Each broker will have a set of customers that he or she represents and will enter the customer code information, as well as codes indicating the broker's own account(s), in advance into entry device 201. Customer codes may be standardized or may be unique to each broker. In most cases a broker will have a list of under 20 customers at any given trading session which makes drop-down list box 518 convenient and efficient for data entry. In a particular implementation control 518 is activated by tapping on the touchscreen interface of device 201 and manipulated by tapping on an appropriate selection. The currently selected customer identification is displayed in control 518. A new order for the currently selected customer is initiated by tapping on the new order control labeled "NEW" in FIG. 5A.

In the particular example, a "card trade" control 515 causes the current transaction information displayed in windows 502-508 to be transferred to a line-item entry in the view-specific data window 501. The card trade activity is analogous to writing a transaction down onto a paper pit card. Unlike the paper record, however, the broker can have most of the information for the transaction already entered. In contrast, in a paper environment the broker may begin handwriting information onto the card only after the trade is verbally completed. This can save several seconds of broker time as the card trade button 515 can be activated immediately after the last piece of trade data is entered.

The present invention contemplates a number of action controls 514 that are activated by a user tapping on the area defined by the control. When activated, the control initiates a particular programmed action. In the particular example, a clear button, labeled "CLR" in FIG. 5, causes information in the display windows 502-508 to be cleared. This is useful when a contemplated transaction is not completed and allows the broker to work ahead by entering data even though the transaction may not be carded. A submit control, labeled "SUB" in FIG. 5, causes carded trades appearing in view-specific data window 501 to be submitted to the server 203. The action of the submit control is analogous to throwing a paper pit card into the pit.

View-specific display window 501 is so named because it changes its contents based upon the current state of a transaction and to show a broker 103/113 different views of various activities. As described above, the view-specific display window 501 can be used to show carded trade data, and can be used to display special purpose tools such as keypads, keyboards, favorites lists and the like. It is also contemplated that several alternative views may be defined that can be displayed by activation of navigation controls 516. For example, the CARDS control activates a view in which virtual pit cards can be displayed in display window 501 on a customer-by-customer basis. A POSITIONS control activates a view in which a customer's net positions (or positions of the trader trading on his/her own account) are displayed. A SETTINGS control enables the user to affect various settings of the handheld device 201 itself, program functionality associated with hardware buttons, and the like.

Figure 6:
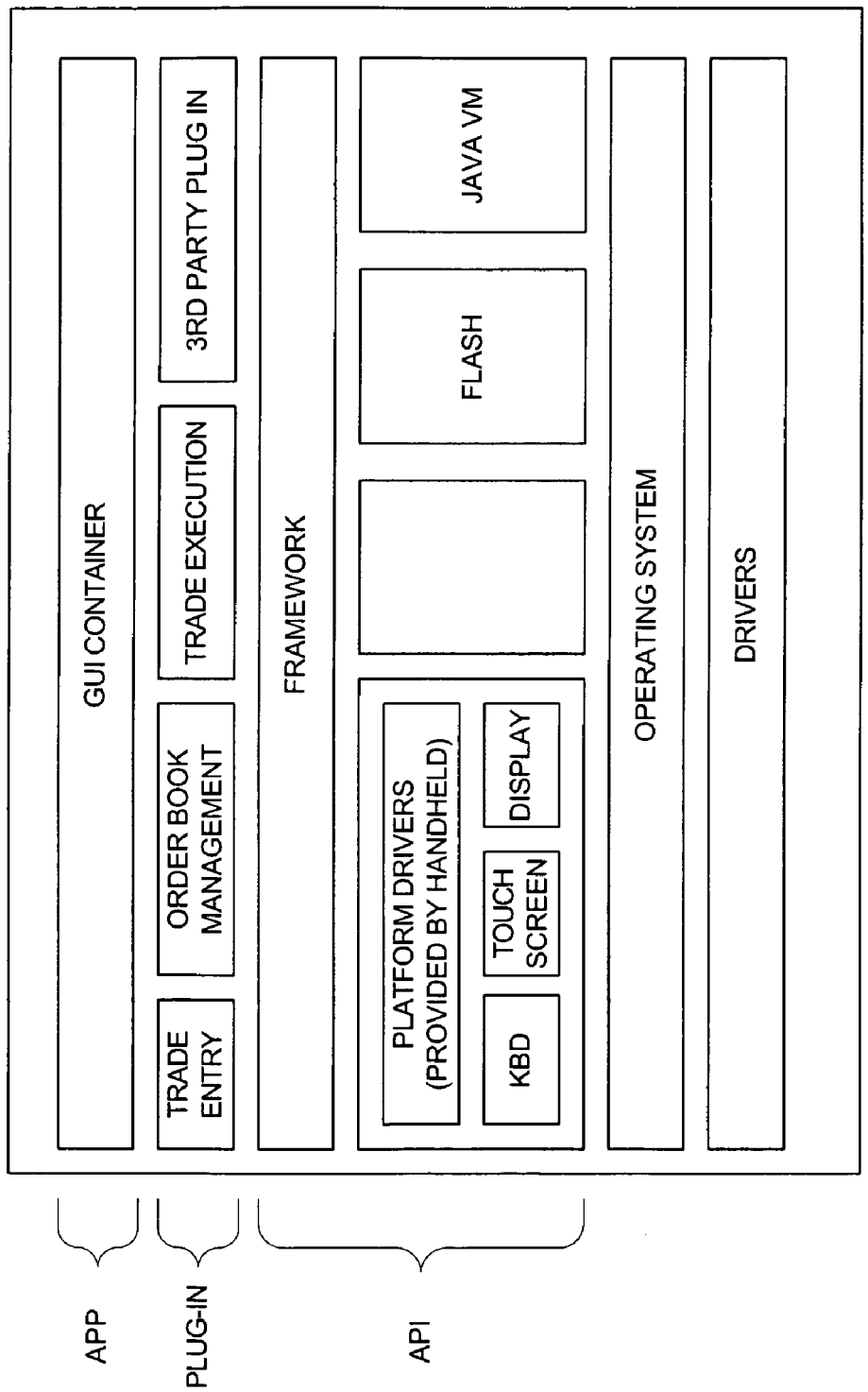
FIG. 6 is a representation of the software structures within an exemplary trading device in accordance with the present invention.

31 FIG. 6 illustrates a logical view of processes implemented by a handheld device 201 device in accordance with the present invention. The drivers layer interfaces with the various hardware components shown in FIG. 4. Drivers may be added and removed from the drivers layer to support additional or updated functionality. Operating system ("OS") layer may be provided by any available operating system, although it is useful to have an operating system that has a relatively small resource consumption such as Linux, Windows CE® or the like.

The application programming interface (API) layer comprises various processes that provide access to OS services and augmnent OS services for use by particular applications. For example, the API layer may provide Universal Plug-and-Play (UPnP™) processes that support common protocols and procedures intended to enhance interoperability among network-enabled PCs, appliances, and wireless devices. Flash processes implement services related to Macromedia® FLASH programming environment and extensions. Platform drivers are similar to hardware drivers, but offer more complex and platform-specific functionality for devices such as hardware switches, LED indicators, and an LCD display.

Each handheld device 201 may have a distinct set of plug-in components to meet the needs of a particular trading environment where the handheld device 201 is used. Further, the set of plug-in components can be changed based on specific user preferences. Similarly, the functionality of each component can be altered to increase or decrease the functionality based on the current user of the control panel, or the time of day, or other configurable permissions basis. Any number of third party plug-ins are possible to implement extended functionality. Third party plug-ins are designed to comply with the API layer, or in some cases may interact with the operating system directly.

Sophisticated configurable functionality is implemented by application layer, labeled "APP" in FIG. 6, and plug-in components. In a particular configuration, handheld device 201 implements a GUI container containing various GUI components from, for example, MICROSOFT®.NET connection software. The GUI container may implement JAVA components, FLASH components, or other available or custom GUI components to meet the needs of a particular application. JAVA is a trademark or registered trademark of Sun Microsystems, Inc. in the United States and other countries. FLASH is a trademark or registered trademark of Macromedia, Inc. in the United States and other countries. Microsoft-.NET is a trademark or registered trademark of Microsoft Corporation in the United States and other countries. These GUI components interface with various plug-in components. Optionally, a browser user interface is provided to supplement the GUI interface. So much software and plug-in functionality is available for common browser GUIs such as Mozilla, Internet Explorer, and the like that it may be useful to provide a browser interface and web plug ins to perform certain functions that augment and/or replace various other plug-ins.

Figures 7A, 7B:
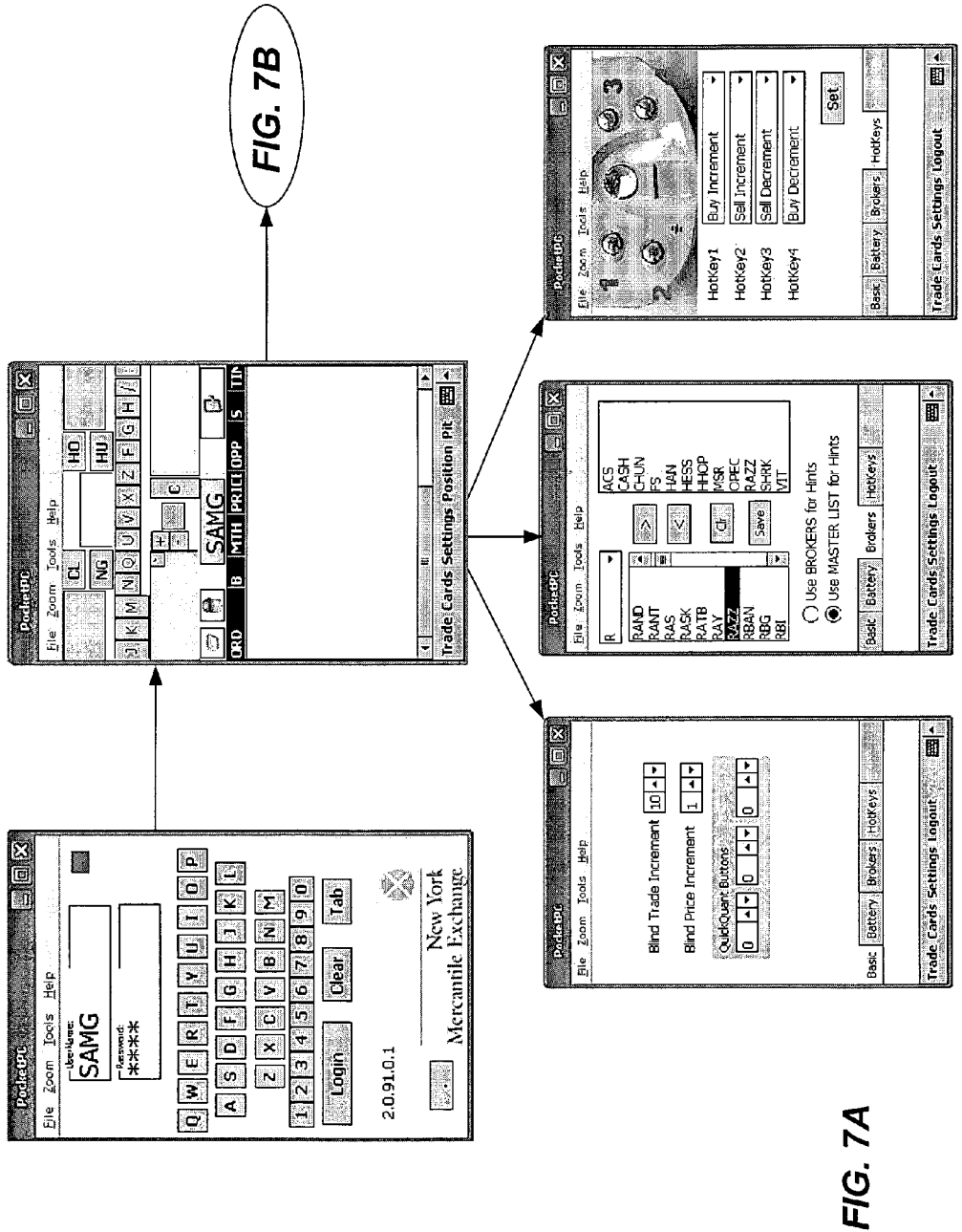
FIG. 7A and FIG. 7B illustrate an exemplary screen flow in accordance with a particular implementation of the present invention.
Figure 7A:
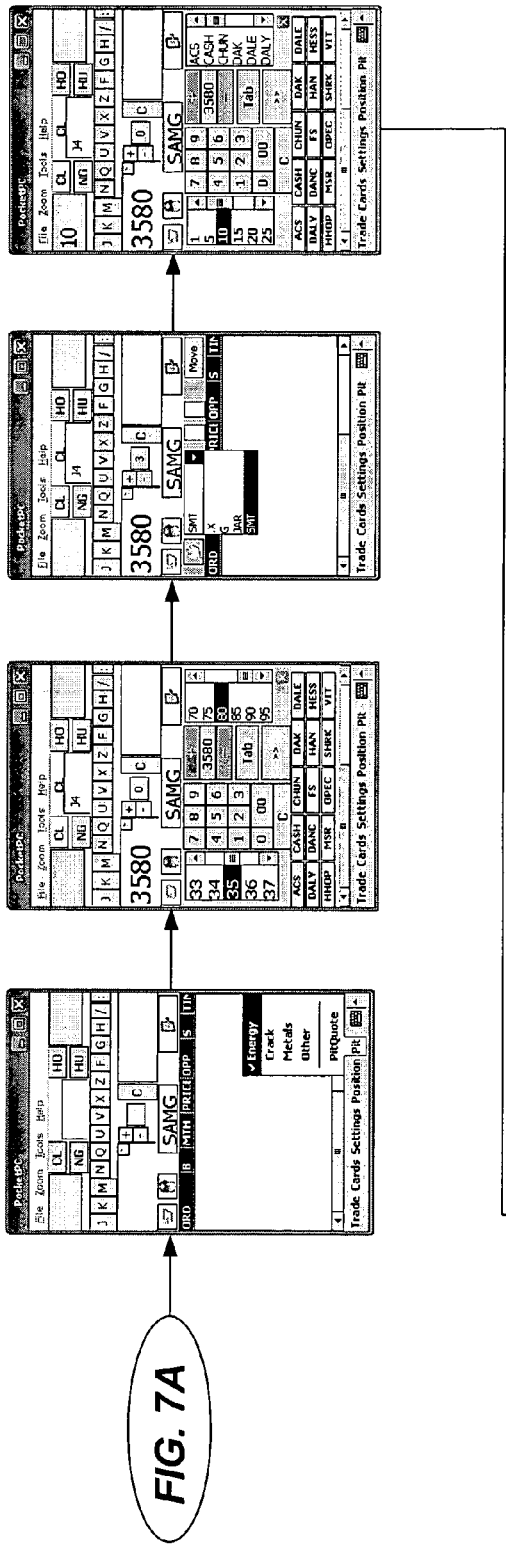
Figure 7B:
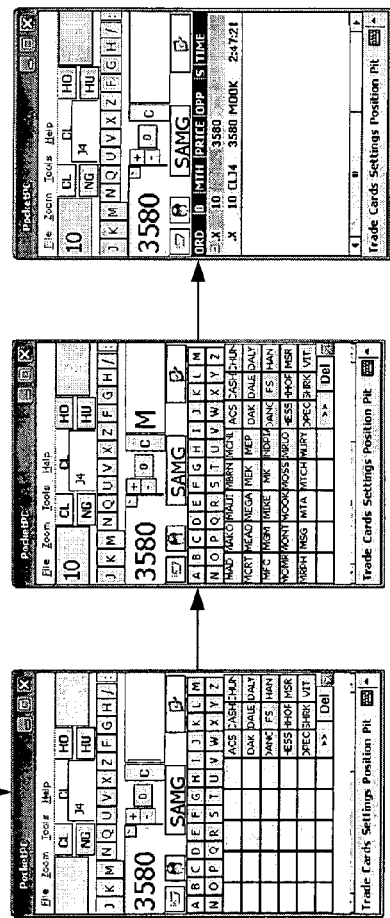

FIG. 7A and FIG. 7B illustrate an exemplary screen flow showing transitions as data is entered to record a trade. It should be understood that one advantage of the present invention is that data may be entered in a variety of sequences as that information becomes available to a trader. The operations illustrated in FIG. 7A occur prior to and in preparation of actual trading. As shown in the upper left hand drawing of FIG. 7A, a typical implementation requires that a user perform login operations to provide a desired level of security for a particular application. As noted hereinbefore, the user's identification (e.g., "SAMG" in the example) as entered in the login screen is preferably associated with all data communication between the wireless device and upstream servers.

Upon successful completion of the login, a "trades" screen is presented which includes various navigational controls for both entering trade information (shown generally in FIG. 7B) and for accessing various settings functions as shown in FIG. 7A. The "basic" settings screen at the lower left portion of FIG. 7A allows the user to set default values for trade increments and price increments. These values allow trade information to be entered quickly using increase/decrease controls rather than keypad entries. Similarly, the brokers setting screen allows users to add and remove broker IDs to and from the shortlist. During appropriate times during trading the shortlist of brokers is presented to the user to allow entry of a broker ID without requiring keyboard entry. As shown in the lower right hand screen, the user may also set up various functions assigned to hardware buttons on the particular handheld device. The setup functions described herein are not exhaustive as a wide variety of features may be customized in preparation of trading. In general, any trading function that involves multiple keystrokes or stylus taps during actual trading may be simplified during the setup customizations using the hot keys, default values, and shortlists options described in reference to FIG. 7A. Preferably, settings for a particular user are retained so that they do not need to be entered each time the handheld device 201 is activated.

Once the settings are entered, the user is ready to begin trading. Referring to FIG. 7B, a user may optionally select which pit or trading arena will be the current environment for trading as shown in the upper left hand screen of FIG. 7B. The settings described hereinbefore may be implemented separately for each trading pit that the user operates in. A user selects a commodity code (CL in the example) and delivery month (J4 in the example) and then enters price information (3580 in the example). Although the price information can be entered by the keypad, it is preferably entered by selecting from the numeric lists as using the lists can save several keystrokes. If necessary the user may select an account (either a customer account or the brokers own account) using the pull down control shown in the third screen of FIG. 7B. If the customer account information is not present it may be entered using a virtual keyboard, however, using the pull down list is preferred as it saves keystrokes and time.

As shown in the upper right hand screen, trade size (10 in the example) is entered to indicate the number of units being traded in the current transaction. When the user is a buyer, the trade size information appears in the upper left hand window of the trades screen, whereas when the user is a seller the trade size information appears in the upper right hand window of the trades screen. As noted before, color coding of the interface elements gives the broker/trader a continuous indication of whether buy or sell information is being entered. Again, the trade size information is preferably entered using the pull down list.

Opposing broker information can be entered from the short list that appears in the trades window in the upper right hand screen. Alternatively, by tapping on the opposing broker window the screen shown in the lower left of FIG. 7B is presented to allow the user to select an opposing broker using keyboard entry assisted by automatic hints. In the specific example, the user taps on the "M" key which brings up a hint list of broker IDs beginning with the letter M. The user can continue entering information by tapping on letters, or select from the presented hint list at any time. The entered information is transferred to the opposing broker ID window as it is entered.

Once the necessary trade-specific information is entered, a trade is carded by tapping on the card trade button (515 in FIG. 5A-B) at which point the trade information appears in the information window of the trades screen as illustrated by the first entry in the lower left hand screen of FIG. 7B. A carded trade is then submitted to the trade management system 205. Preferably the trade management system confirms that the trade has been entered and matched with a trade entered by the opposing broker, after which the information window is updated to indicate the completed trade. This completed trade information has not been readily available to brokers in a timely, almost instantaneous fashion until now.

Figure 10:
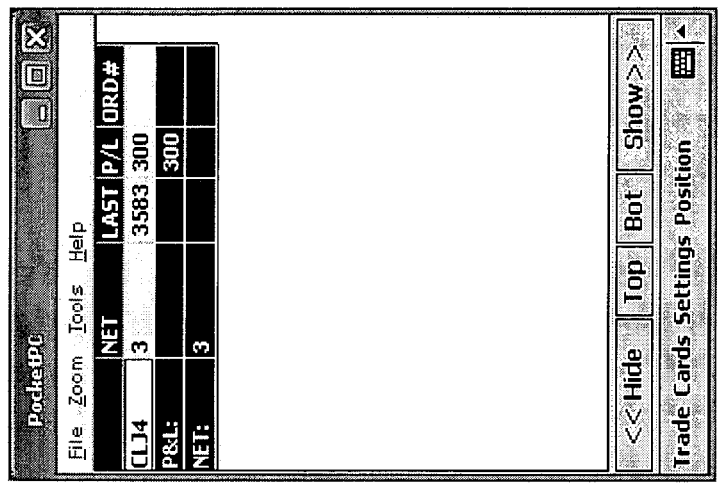
FIG. 10 illustrates another exemplary information screen in accordance with an embodiment of the present invention.
Figure 9:
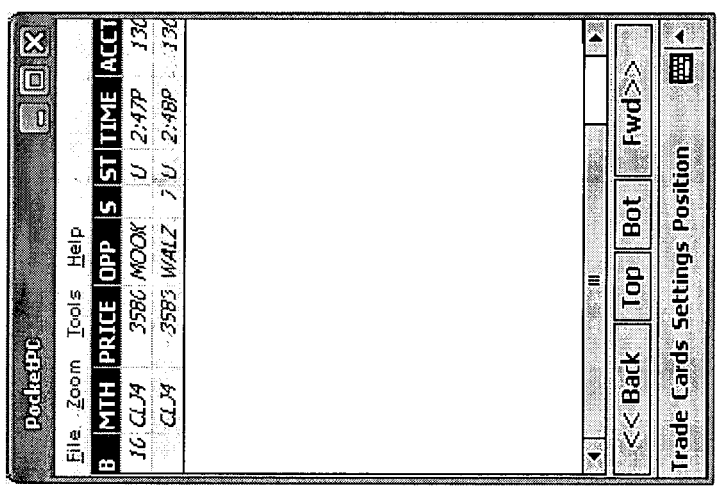
FIG. 9 illustrates an exemplary information screen in accordance with an embodiment of the present invention.
Figure 8:
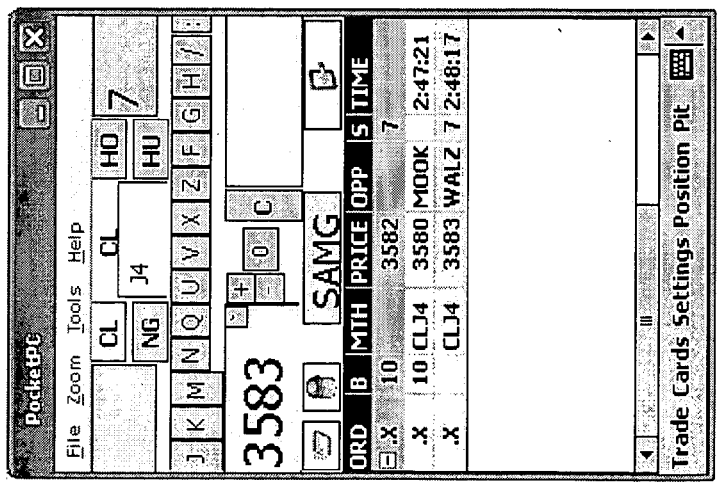
FIG. 8 shows a trade screen with multiple trades recorded.

FIG. 8 shows a trade screen with multiple trades recorded. As the user continues to enter and complete transactions, the trade list is updated as shown in FIG. 8. Specifically, FIG. 8 shows a subsequent sell transaction for seven units that followed the buy transaction involving ten units. FIG. 9 illustrates an exemplary information screen in accordance with an embodiment of the present invention called a "cards" screen. The cards screen is accessed by tapping on the "Cards" control on the lower margin of the trades screen and contains information about completed trades on an account-by-account basis. FIG. 10 illustrates another exemplary information screen called a "positions" screen that is accessed by tapping on the "Positions" control at the lower margin of the trades screen. The positions screen shows an accounts net position with respect to a particular commodity as well as the cumulative profit and loss resulting from completed trades. FIG. 9 and FIG. 10 are but examples of trade information screens that can be provided to users via a handheld wireless device 201.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A commodity trade entry computer device comprising:
a touchscreen display;
a memory storing computer-executable instructions; and
a processor in operative communication with the memory, wherein upon execution of the instructions by the processor, the processor is configured to cause the computing device to:
(a) determine a current delivery month of a commodity and a month code for the current delivery month; and
(b) generate a graphical user interface on the touchscreen display that includes a rolling calendar input configured to dynamically display the month code for the current delivery month in the left most portion of the touch screen display and month codes in sequential order for a plurality of subsequent delivery months of the commodity to the right of the month code for the current delivery month, each of the month codes being a shorthand identifier for a particular month.

2. The commodity trade entry computer device of claim 1, wherein the computer device comprises a handheld device.

3. The commodity trade entry computer device of claim 1, wherein the computer device comprises a wireless device.

4. The commodity trade entry computer device of claim 1, wherein the memory comprises a random access memory.

5. The commodity trade entry computer device of claim 1, wherein the graphical user interface comprises a pitcard interface.

6. The commodity trade entry computer device of claim 1, wherein the processor, upon execution of the instructions, causes the computer device to transmit an HTTP request to a uniform resource identifier (URI) associated with a trade system, the HTTP request including parameters representing entry data.

7. The commodity trade entry computer device of claim 1, wherein the processor, upon execution of the instructions, causes the computer device to transmit an electronic pitcard containing an opposing trader, a commodity, a quantity of a commodity, and a delivery month for a particular commodity trade.

8. The commodity trade entry computer device of claim 1, wherein the graphical user interface comprises a commodity code selector control.

9. The commodity trade entry computer device of claim 1, wherein the processor, upon execution of the instructions, causes the computer device to activate a user input control in response to tapping on an opposing trader identification display window.

10. The commodity trade entry computer device of claim 1, wherein the graphical user interface provides a listing of broker identifiers.

11. The commodity trade entry computer device of claim 10, wherein the listing of broker identifiers is ordered based on an order of occurrence of recent transactions.

12. The commodity trade entry computer device of claim 10, wherein the listing of broker identifiers is ordered based on frequency of use.

13. The commodity trade entry computer device of claim 1, wherein the processor, upon execution of the instructions, causes the computing device to:
identify a change in the current delivery month, and
in response to identifying the change, update the graphical user interface by moving the month codes for each of the plurality of subsequent delivery months to the left, and moving the month code for the current delivery month to the right of the month codes for the subsequent delivery months.

14. A computer implemented method comprising:
determining, by a processor, a current delivery month of a commodity and a month code for the current delivery month; and
generating, by the processor, a graphical user interface on a display configured to dynamically display the month code for the current delivery month in the left most portion of the display and month codes in sequential order for a plurality of subsequent delivery months of the commodity to the right of the month code for the current delivery month, each of the month codes being a shorthand identifier for a particular month.

15. The method of claim 14, further comprising transmitting an HTTP request to a trade system, the HTTP request including parameters representing entry data.

16. The method of claim 14, further comprising:
identifying a change in the current delivery month; and
updating the graphical user interface by moving the month codes for each of the plurality of subsequent delivery months to the left, and moving the month code for the current delivery month to the right of the month codes for the subsequent delivery months.

17. An apparatus comprising:
a display screen;
a memory storing computer-executable instructions; and
a processor in operative communication with the memory, wherein upon execution of the instructions by the processor, the processor is configured to cause the apparatus to at least:
(a) determine a current delivery month of a commodity and a month code for the current delivery month; and
(b) generate a graphical user interface on the display screen configured to dynamically display the month code for the current delivery month in the left most portion of the display screen and month codes in sequential order for a plurality of subsequent delivery months of the commodity to the right of the month code for the current delivery month, each of the month codes being a shorthand identifier for a particular month.

18. The apparatus of claim 17, wherein the processor, upon execution of the instructions, causes the apparatus to transmit an HTTP request to a trade system, the HTTP request including parameters representing entry data.

19. The apparatus of claim 17, wherein the processor, upon execution of the instructions, causes the apparatus to:
identify a change in the current delivery month, and
update the graphical user interface by moving the month codes for each of the plurality of subsequent delivery months to the left, and moving the month code for the current delivery month to the right of the month codes for the subsequent delivery months.

20. The apparatus of claim 17, wherein the graphical user interface provides a listing of broker identifiers that are ordered based on one of an order of occurrence of recent transactions and frequency of use.

* * * * *